(No Model.)
J. C. PUGH.
PLOWSHARE.
No. 302,027. Patented July 15, 1884.
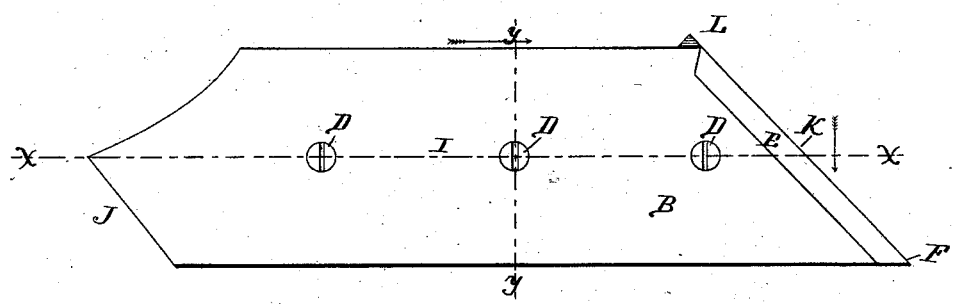
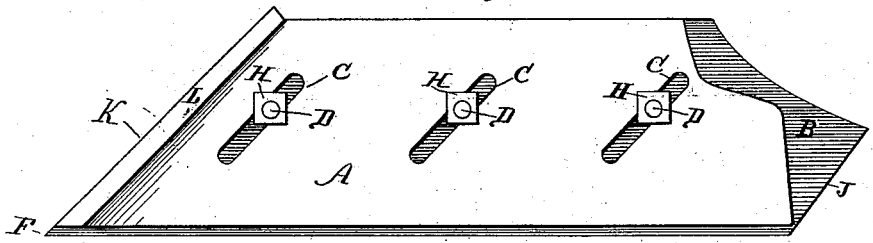
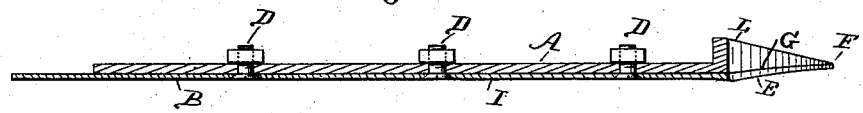
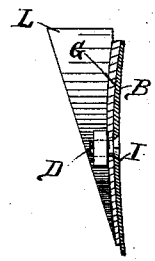
WITNESSES:
Thos. Houghton.
A. G. Lyne.
INVENTOR:
James C. Pugh
BY Munn & Co
ATTORNEYS.

UNITED STATES PATENT OFFICE.

JAMES CRAWFORD PUGH, OF ASHTON, DAKOTA TERRITORY.

PLOWSHARE.

SPECIFICATION forming part of Letters Patent No. 302,027, dated July 15, 1884.

Application filed April 21, 1884. (No model.)

*To all whom it may concern:*

Be it known that I, JAMES CRAWFORD PUGH, of Ashton, in the county of Spink and Territory of Dakota, have invented a new and useful Improvement in Plowshares, of which the following is a full, clear, and exact description, reference being had to the annexed drawings, forming part of this specification.

This invention consists of a plowshare formed with an adjustable plate which constitutes the cutting-edge of the plowshare, as hereinafter described and claimed.

In the drawings, Figure 1 is a front view of my improved plowshare. Fig. 2 is a bottom view of the same. Fig. 3 is a section of the same on line $x\ x$ of Fig. 1, and Fig. 4 is a section on line $y\ y$ of Fig. 1.

A indicates the body of the plowshare, which has the form of an ordinary plowshare, and B is a thin steel plate bolted to the front side of said body, with its lower edge projecting below the lower edge thereof to form the cutting-edge and point of the plowshare. The body A is formed with oblique slots C, through which the bolts D are passed for securing the plate in an adjustable manner, to adapt the same to be let down from time to time as the edge wears off. The plate being thin, no sharpening of the edge will be required. The part E of the plate is made thicker than the rest of it, to give the required strength for the point F. The plate is made plane, and is to be drawn into contact with the concave surface G of the body A by the bolts D and nuts H, to form close joints between the upper and lower edges of the plate and body. The plate may be made slightly thicker at the center I than at the edges, to facilitate the fitting of the plate on the concave surface of the body. The side edges, J and K, of the plate are cut parallel, or nearly so, with each other, so that as the plate is adjusted downward after being worn off the edge formed thereby shall always be of uniform length.

Some of the advantages of the above construction are the following: The share may be sharpened without the expense of time and labor required in taking it to a blacksmith and having the edge hammered to make it thin. Owing to the shape of the plate B, the original width of cut is maintained, which cannot be done where the edge of the share wears off and is hammered to make it sharp again, as in the usual form of plowshare. With this construction, also, the edge of the share is kept on a level with the bottom of the landside-bar L, which cannot be done in a plowshare where the edge-forming part is not adjustable with respect to said bar. Again, less steel is required in making the plowshare, since the body B may be made of iron, and the temper of the steel will not be drawn as in ordinary shares, which require repeated heating and hammering to sharpen them.

The cutting-edge will ordinarily be about one-sixteenth of an inch thick, while the plate at the middle will be above one-eighth of an inch thick, and the part thereof forming the point and shin will also be thicker than the main part to give the required strength. The upper edge of the plate will be quite thin, so as not to form a projection on the body B, which will gather soil on the mold-board. Some kinds of land—such as stony or gravel land—will require heavier cutting-edges than that above indicated, and such edges may be filed, if desired.

I am aware that adjustable plates for forming the cutting-edges of plows have been used prior to my invention, and I do not claim such, broadly.

What I claim is—

A plate for forming the cutting-edge of a plowshare, having its longitudinal center and landside edge made thicker than its main part, substantially as shown and described.

JAMES CRAWFORD PUGH.

Witnesses:
STEPHEN CALHOON,
S. P. WATKINS.